United States Patent [19]

Borsuk

[11] Patent Number: 4,709,449
[45] Date of Patent: Dec. 1, 1987

[54] PASS-THROUGH PROTEINACEOUS PATTY MAKING APPARATUS

[75] Inventor: Alvin Borsuk, Madison, Wis.

[73] Assignee: Oscar Mayer Foods Corporation, Madison, Wis.

[21] Appl. No.: 829,581

[22] Filed: Feb. 13, 1986

[51] Int. Cl.⁴ .............................................. A22C 7/00
[52] U.S. Cl. ...................................... 17/32; 426/513
[58] Field of Search ................... 17/32; 426/274, 513

[56] References Cited

U.S. PATENT DOCUMENTS 3,124,469  3/1964  Carruthers ........................ 426/513
3,236,656  2/1966  Wittig ............................. 426/513 X
3,730,740  5/1973  Schack et al. .................... 426/513 X
4,054,967  10/1977  Sandberg et al. ................. 426/513 X
4,276,318  6/1981  Orlowski et al. .................... 17/32 X
4,421,019  11/1983  Hocking et al. ................. 426/274 X Primary Examiner—Willie G. Abercrombie
Attorney, Agent, or Firm—Joseph T. Harcarik; Thomas R. Savoie; Daniel J. Donovan

[57] ABSTRACT

An apparatus is provided for forming a series of proteinaceous patties such as ground meat patties and for depositing those patties in timed sequence onto a conveyor belt assembly that passes through the entire longitudinal length of the apparatus, including passage through a protective tunnel assembly.

6 Claims, 4 Drawing Figures

PASS-THROUGH PROTEINACEOUS PATTY MAKING APPARATUS

BACKGROUND AND DESCRIPTION OF THE INVENTION

The present invention generally relates to an apparatus for making a patty of proteinaceous material, and more particularly to a patty making apparatus which incorporates a conveyor belt assembly that traverses a path substantially throughout the entire horizontal longitudinal extent of the apparatus, including a location below the assembly which forms the proteinaceous patties in order to impart a pass-through aspect to the apparatus. This pass-through aspect of the apparatus facilitates depositing each proteinaceous patty as it is made onto an item such as another proteinaceous patty and the like that was deposited onto the conveyor belt assembly at a location generally upstream of the apparatus, such being particularly useful in conjunction with food processing, particularly the assembly of composite food products including a proteinaceous patty stacked onto another proteinaceous patty and/or other food items.

Various devices are available commercially for preparing shaped patties out of proteinaceous material, typically ground, flaked or shredded meats, fish, poultry and/or vegetables. These proteinaceous materials are of a type that, when suitably positioned within a mold and generally subjected to compressive forces, will form into a desired shape or patty. Usually, such proteinaceous materials are filled into a hopper and suitably fed to a molding station which forms the patty. In most situations, the molding station deposits the formed patty by dropping same onto a suitable platform, which can include a moving conveyor.

In the past, when such patty making machines deposited onto a conveyor, the conveyor belt flow path initiates within the machine, and the conveyor moves the proteinaceous patties away from the machine for subsequent processing of the patties, typically for freezing same. Machines of this type, while being quite suitable for forming proteinaceous patties which are subsequently processed, cannot be used for depositing proteinaceous patties onto another item that is being automatically supplied by another machine or device and continuously deposited onto the moving conveyor belt. When it is desired to manufacture a product including a proteinaceous patty which is not the bottommost member of the item, these types of patty making machines are not suitable if it is desired to assemble the item on an automatic and continuous basis.

The present invention permits such automatic and continuous assembly operations which include the forming and depositing of a proteinaceous patty onto another food product or the like by providing a patty making apparatus that, rather than having the conveyor assembly provide its initial outward conveying movement positioned within the apparatus, provides a conveyor assembly having a conveyor pathway fully through the entire generally horizontal length of the apparatus such that the conveyor pathway is initiated at a generally upstream location with respect to the apparatus, which pathway continues through the apparatus to the location at which the proteinaceous patties are deposited from the patty forming station and then continues beyond this patty depositing location and in a direction away from or downstream of the apparatus.

Included in the features that are provided by the present invention for achieving this type of pass-through function is to provide a generally horizontally oriented tunnel assembly through the cabinet which houses components for driving the patty forming assembly. The conveyor belt assembly has its conveying pathway pass through the tunnel in a direction toward the patty depositing location, which pathway continues beyond the patty depositing location for conveying products out of the apparatus. Preferably, the conveyor belt assembly has associated therewith a suitable timing arrangement for having each deposited patty drop, in suitably aligned fashion, onto one of a series of items that had been positioned onto the pass-through conveyor path upstream of the apparatus.

It is accordingly a general object of the present invention to provide an improved apparatus for continuously making and depositing patties of proteinaceous material that are continuously deposited onto previously formed items.

Another object of this invention is to provide an improved pass-through proteinaceous patty making apparatus that provides for a conveyor pathway completely through its longitudinal extent.

Another object of this invention is to provide an improved proteinaceous patty making machine having pass-through and timing capabilities whereby proteinaceous patties formed by the machine are deposited in properly sequenced fashion with respect to a sequence of previously formed items as they flow through the apparatus.

These and other objects, features and advantages of this invention will be clearly understood through a consideration of the following detailed description.

BRIEF DESCRIPTION OF THE DRAWINGS

In the course of this description, reference will be made to the attached drawings, wherein.

DESCRIPTION OF THE PARTICULAR EMBODIMENTS

Figure 1:
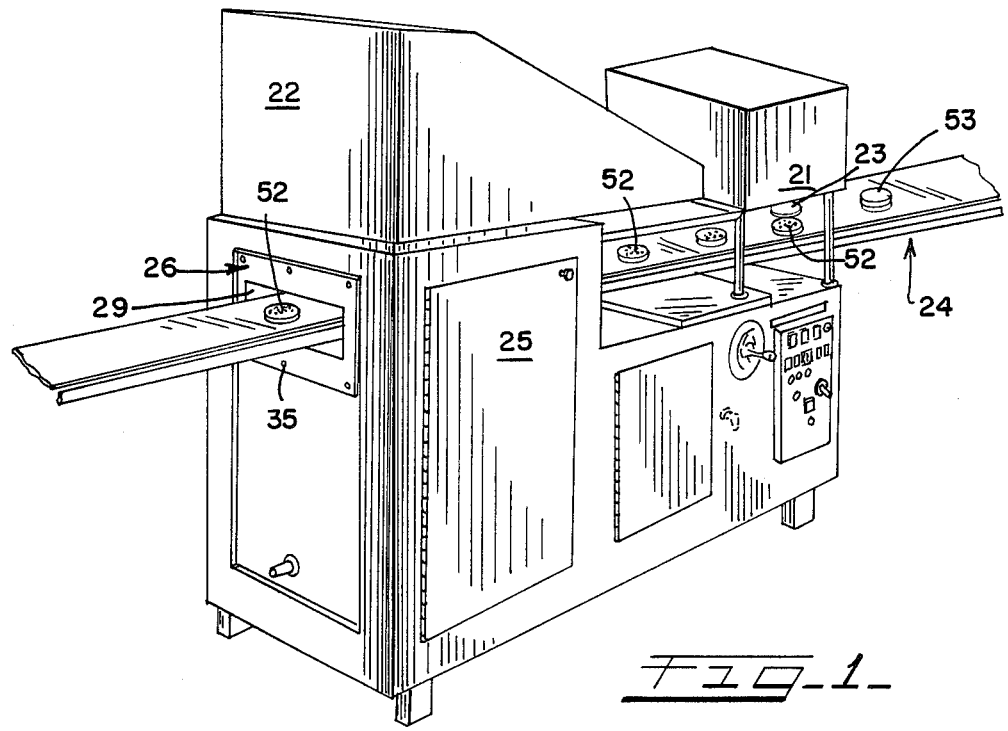
FIG. 1 is a perspective view of the pass-through apparatus according to this invention.

The illustrated pass-through proteinaceous patty making apparatus illustrated in FIG. 1 includes an assembly 21 for forming and depositing patties from proteinaceous material stored in a hopper 22. Assembly 21 forms patties 23 and deposits such patties 23 onto an elongated pass-through conveyor assembly, generally designated as 24, which is generally horizontally oriented throughout the longitudinal extent of the apparatus. Illustrated patty making and depositing assembly 21 is shown depositing a single series of patties 23, and it will be appreciated that assembly 21 can be arranged for making and depositing a plurality of patties along its transverse extent so as to provide a plurality of patty rows.

Elongated pass-through conveyor assembly 24, in addition to passing under the patty forming assembly 21, passes through a cabinet 25 housing certain mechanism including that to be described hereinafter for operating the patty forming assembly 21. More particularly, the cabinet 25 includes a tunnel assembly, generally designated as 26, which is generally horizontally oriented within the cabinet 25 and secured thereto. Tunnel assembly 26 is sized and configured so as to accept passage therethrough of the elongated pass-through conveyor assembly 24. Included in this regard are horizontal top panel 27, horizontal bottom panel 28, and side panels 29 connecting the panels 27 and 28 so as to form a box-like sleeve or drawer. The tunnel assembly 26 is secured into the cabinet 25 in a substantially water-tight manner so that the sleeve and its side walls 27, 28 and 29 can be thoroughly washed down for normal and necessary clean-up operations that are typically followed in the food processing industry. The illustrated means for accomplishing this water-tight property are perhaps best seen in FIG. 2.

Figure 2:
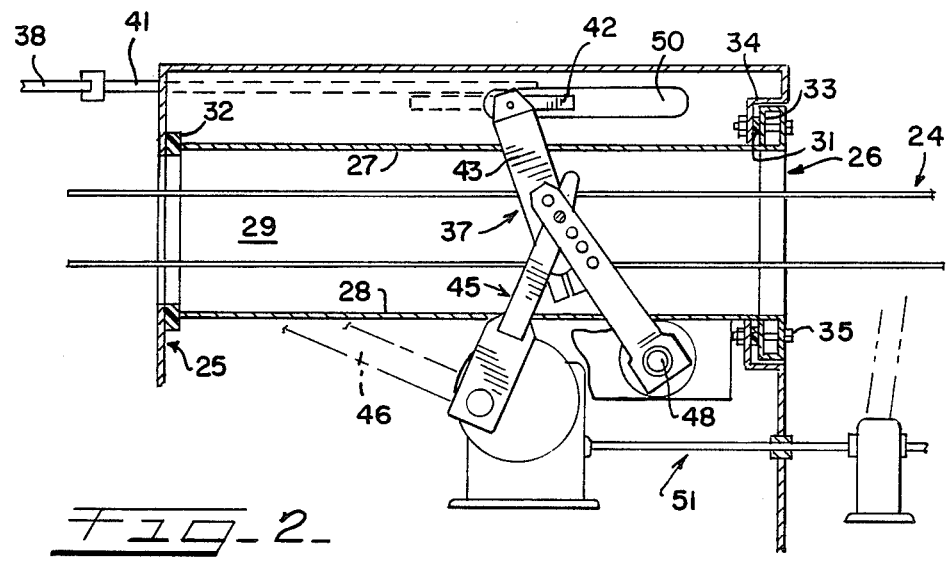
FIG. 2 is a partial cross-sectional view of a portion of the cabinet housing drive components for the patty making mechanism, such portion of the cabinet including a pass-through tunnel assembly.
Figure 3:
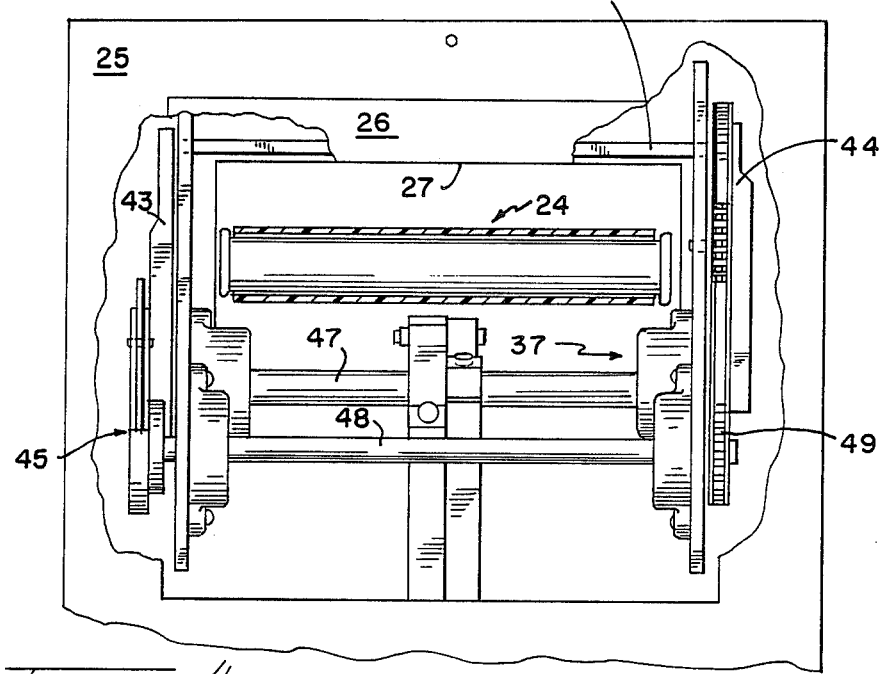
FIG. 3 is an elevational end view, partially broken away, of the upstream end of the apparatus.

The illustrated drawer or sleeve is installed by being slid through a rear opening 31 within the cabinet 25, such sliding being from right to left as illustrated in FIG. 2 until the front edge of the sleeve, such as the combined front edge of the panels 27, 28 and 29 engage a suitable seal 32. The sleeve and its panels 27, 28 and 29 are sized to have a length such that, when seal 32 is thus engaged and compressed to a desired extent, the tunnel assembly 26 is in its installed location as shown in FIG. 2, and preferably a rear edge lip 33 thereof engages the opening 31 and/or a seal or gasket 34, such installation typically being facilitated by a plurality of fastening members such as the illustrated nut and bolt assemblies 35. This structure, in addition to providing a water-tight sleeve or drawer, permits easy removal of the tunnel assembly 26 when desired.

Figure 4:
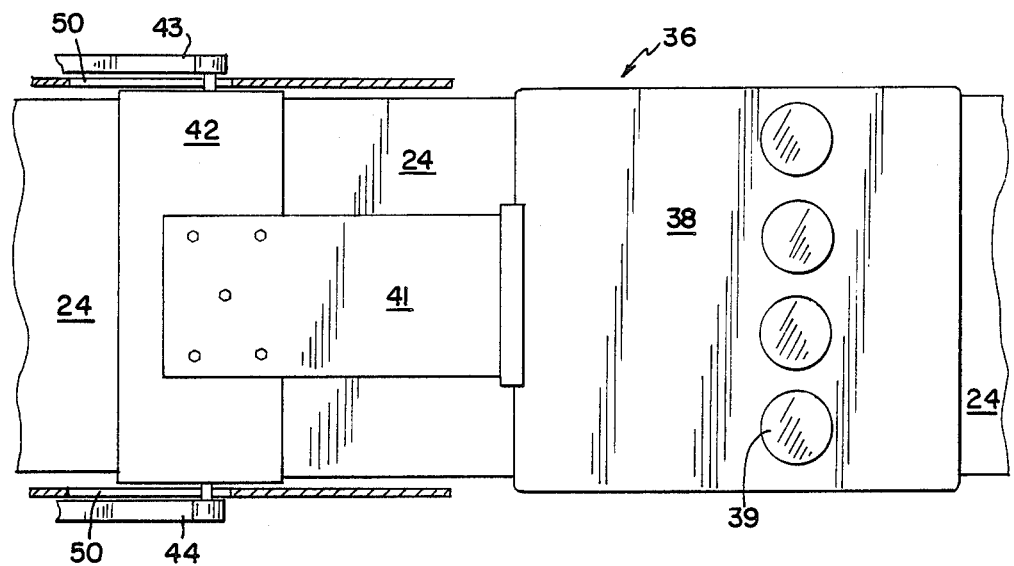
FIG. 4 is a top plan view, partially broken away, of the patty forming apparatus.

With more particular reference to the structures that are involved in actual formation of the proteinaceous patties 23, such generally include a mold plate and pusher assembly, generally designated as 36 in FIG. 4, and a mold pusher plate drive assembly, generally designated as 37 in FIG. 2. Mold plate and pusher assembly 36 includes a mold plate 38 including molding cavities 39 which cooperate with other components (not shown) of the patty forming assembly 21 in a known manner in order to form a proteinaceous patty 23 within each molding cavity 39. Four such molding cavities 39 are shown in FIG. 4, which provide the capability of simultaneously forming four rows of patties onto the conveyor. After the patties are thus formed, suitable known release means (not shown) push the proteinaceous patties 23 from the molding cavity 39, at which time the proteinaceous patty 23 drops from the patty forming assembly 21 and onto the conveyor. Details regarding the apparatus for forming and depositing the patties are generally known; for example, suitable structures in this regard are described in U.S. Pat. No. 4,054,967 the disclosure of which is incorporated by reference hereinto. A drive plate 41 is secured to the mold plate 38 and transmits back and forth motion to the mold plate 38, such motion being generally longitudinal of the entire apparatus, in response to driving or retracting movement imparted thereto by the mold pusher plate drive assembly 37. In this regard, a transverse plate 42 is secured to the drive plate 41, by virtue of which the mold plate and pusher assembly 36 is in operative engagement with the mold pusher plate drive assembly 37.

Mold pusher plate drive assembly 37 includes two drive arms 43, 44 that are in pivotable driving engagement with opposite ends of the transverse plate 42. Slots 50 are provided through the illustrated support plates in order to permit communication between the respective drive arms 43 and 44 and the transverse plate 42. Back-and-forth movement of the drive arms 43, 44 will oscillate the transverse plate 42 and thus move the mold plate 38 between its orientations within the patty forming assembly 21 for forming and for ejecting the patties. Included in this regard is a linkage assembly 45 which is provided for timed driving of the drive arms 43 and 44 and of a drive chain 46 or the like for effecting plunged ejection or release of formed patties by the patty forming assembly 21 in a manner previously known and practiced. Drive arms 43 and 44 rotate simultaneously with a transverse shaft 47. Another transverse shaft 48, to which is secured a chain drive assembly 49 or the like for driving an assembly (not shown) to transport proteinaceous material within the hopper 22 to the patty forming assembly 21. Slots 50 are provided through the illustrated support plates in order to permit communication between the respective drive arms 43 and 44 and the transverse plate 42.

Substantially all of these various drive components are driven by a main drive assembly, generally designated as 51, for driving these components as well as the elongated pass-through conveyor assembly 24. Such drive arrangement, which preferably incorporates line shaft means, is provided so that the movement of the conveyor assembly 24 is in timed sequence with the patty forming assembly 21, especially the patty ejection mechanism. By this timing arrangement, a series of spaced items 52, each of which may include a proteinaceous patty, are received on the conveyor assembly 24 in a predetermined spaced or timed relationship, which relationship is followed to the extent that the patty forming assembly 21 deposits proteinaceous patties 23 in the same timed sequence so that each proteinaceous patty 23 therefrom is deposited directly onto and in substantially full alignment with each item 52 in order to form a composite product 53.

It is preferred to minimize the height through which each proteinaceous patty 23 drops when falling from the mold plate and pusher assembly 36 and onto each spaced item 52 in order to enhance the efficiency of the apparatus and in order to reduce the chance of damage to the proteinaceous patty 23 and to the composite product 53. Accordingly, minimum clearance is provided between the bottom of the mold plate and pusher assembly 36 and the top of the particular spaced items 52 being processed by the apparatus.

It will be understood that the embodiments of the present invention which have been described are illustrative of some of the applications of the principles of the present invention. Numerous modifications may be made by those skilled in the art without departing from the true spirit and scope of the invention.

I claim:

1. A pass-through proteinaceous patty making apparatus, comprising:
   proteinaceous patty forming means for forming proteinaceous patties and depositing same on a moving conveyor belt assembly, said proteinaceous patty forming means being located substantially above the conveyor belt assembly, and wherein said proteinaceous patty forming means includes a mold plate and pusher assembly having a mold plate member with at least one mold cavity for forming a proteinaceous patty therewithin;

a cabinet having a generally horizontally oriented tunnel assembly through at least a portion of the horizontal longitudinal extent of the cabinet, wherein said cabinet houses at least a portion of an assembly for driving said proteinaceous patty forming means, wherein said assembly for driving said proteinaceous patty forming means includes a transverse shaft in operative engagement with said mold plate member and two drive arms, each drive arm being mounted onto opposite ends of said transverse shaft, and wherein said drive arms are engaged by drive means for moving said drive arms with back-and-forth motion, whereby said mold plate member oscillates between an orientation thereof for forming and for depositing the patties;

said conveyor belt assembly includes an elongated endless belt member which traverses a path substantially throughout the horizontal longitudinal extent of the cabinet, including through said tunnel assembly and under said patty forming means; and timing means associated with said conveyor belt assembly and with said proteinaceous patty forming means, said timing means being for depositing a proteinaceous patty from said proteinaceous patty forming means onto an item that had been deposited onto the elongated endless belt member upstream of said tunnel assembly.

2. The pass-through proteinaceous patty making apparatus according to claim 1, wherein both of said two drive arms are positioned externally of and on generally opposite sides of vertical walls of said tunnel assembly.

3. The pass-through proteinaceous patty making apparatus according to claim 1, wherein both of said two drive arms are positioned externally of and on generally opposite sides of vertical walls of said tunnel assembly, and wherein said transverse shaft is positioned externally of and generally above said tunnel assembly, whereby said drive arms and said transverse shaft are movable through a back-and-forth motion while avoiding interfering engagement with said conveyor belt assembly.

4. The pass-through proteinaceous patty making apparatus according to claim 1, wherein said tunnel assembly is substantially water-tight and includes a seal between panels of the tunnel assembly and said cabinet.

5. The pass-through proteinaceous patty making apparatus according to claim 1, wherein said timing means is for driving said drive arms in timed sequence with movement of said conveyor belt assembly.

6. The pass-through proteinaceous patty making apparatus according to claim 1, wherein a clearance is provided between the bottom of said proteinaceous patty forming means and the top of said conveyor belt assembly, and wherein said clearance is a minimum clearance needed to accommodate items being conveyed by said conveyor belt assembly and onto which proteinaceous patties made by said patty forming means are deposited.

* * * * *